March 11, 1958 W. W. PHARIS 2,826,639

REVERTING CALL CIRCUIT FOR TELEPHONE SYSTEMS

Filed Sept. 26, 1956 7 Sheets-Sheet 1

INVENTOR.
WILLIAM W. PHARIS
BY F. H. Henson
AGENT

REVERTING CALL CIRCUIT FOR TELEPHONE SYSTEMS

Filed Sept. 26, 1956 7 Sheets-Sheet 2

March 11, 1958 W. W. PHARIS 2,826,639

REVERTING CALL CIRCUIT FOR TELEPHONE SYSTEMS

Filed Sept. 26, 1956 7 Sheets-Sheet 3

March 11, 1958 W. W. PHARIS 2,826,639

REVERTING CALL CIRCUIT FOR TELEPHONE SYSTEMS

Filed Sept. 26, 1956 7 Sheets-Sheet 4

March 11, 1958 W. W. PHARIS 2,826,639

REVERTING CALL CIRCUIT FOR TELEPHONE SYSTEMS

Filed Sept. 26, 1956 7 Sheets-Sheet 5

March 11, 1958 W. W. PHARIS 2,826,639

REVERTING CALL CIRCUIT FOR TELEPHONE SYSTEMS

Filed Sept. 26, 1956 7 Sheets-Sheet 7

2,826,639

REVERTING CALL CIRCUIT FOR TELEPHONE SYSTEMS

William W. Pharis, Rochester, N. Y., assignor to General Dynamics Corporation, Rochester, N. Y., a corporation of Delaware Application September 26, 1956, Serial No. 612,175

7 Claims. (Cl. 179—17)

This invention relates in general to automatic telephone systems and more particularly to reverting call circuits for use in automatic telephone systems.

The reverting call circuit which forms the subject matter of this invention is an improvement of the reverting call circuit disclosed in the George Elliott Patent 2,659,769, which is assigned to the same assignee as the present invention. The reverting call circuit shown in the aforementioned patent is designed for use in a telephone system of the terminal-per-station type.

It is often desirable to incorporate both terminal-per-station and terminal-per-line operation in the same telephone exchange. In terminal-per-station operation, each station on each line is terminated in a separate set of terminals in the connector banks and the selection of the particular ringing signal applied to the line is determined by which set of terminals is utilized to seize the line. One of the chief advantages of terminal-per-station operation is that it is not necessary to assign a new directory number to a subscriber who moves from one location to another. It is necessary only to connect the set of connector bank terminals representing that station to a line serving the new location. In the representative telephone exchange, a majority of the party lines are given terminal-per-station operation. Rural lines terminating in the exchange are usually given terminal-per-line service since the rural line subscribers are relatively permanently located. Terminal-per-line operation has the advantage of requiring much less equipment since each line has but one set of terminals in the connector banks. In terminal-per-line operation, the particular ringing signal applied to the line is usually selected by setting a minor switch in the connector in accordance with the impulses of the final digit of the directory number.

The reverting call circuit disclosed in the above-identified patent, which as previously stated was designed for terminal-per-station operation, is not suitable for use with terminal-per-line connectors employing superimposed ringing. As is well known in the art, superimposed ringing connectors are normally used to serve party lines having either four or eight subscriber stations. In four-party operation, the side of line plus the polarity of the superimposing battery determines which party is rung. For eight-party service, the one- and two-ring feature is added so that the ringing becomes semi-selective. A problem arises when a reverting call circuit of the type disclosed in the above-identified patent is used in a system of this type. If a calling subscriber should inadvertently dial a final digit which does not correspond to any party on the line, the reverting call circuit, the connector, and the line are put out of service for a period of two to four minutes, which is the time period required for the reverting call circuit to time out. This comes about since no trip battery is supplied to the ring trip relay of the connector circuit on the unequipped terminals of the connector minor switch. It is undesirable to connect trip battery to all of the unused minor switch bank contacts in all of the terminal-per-line connectors in the office.

Therefore, it is the general object of this invention to provide a new and improved reverting call circuit.

It is a more particular object of this invention to provide a new and improved reverting call circuit for use in telephone systems having both terminal-per-station and terminal-per-line operation.

The invention herein disclosed accomplishes the above-cited objects by providing a reverting call circuit which prevents the establishment of a revertive call connection when a final digit which does not correspond to the ringing digits assigned to terminal-per-line stations is received from a calling station on a terminal-per-line party line, but yet functions to establish a revertive call on a terminal-per-station party line regardless of the digital value of the final digit received from the calling station.

On either terminal-per-station or terminal-per-line operation, the reverting call circuit functions to repeat the impulses of each digit but the last to the associated reverting call selector and thence to the selected terminal-per-station or terminal-per-line connector. The impulses of the final digit are stored in the reverting call circuit. When a disconnect operation is performed at the calling station, the reverting call circuit transmits a replica of the stored impulses to the connector, the line is made free, and the line is then seized and rung by the connector. On terminal-per-line operation, the transmission of the final digit to the connector is blocked and the circuits are released if the stored impulses have a digital value corresponding to unused stations on the terminal-per-line party lines. On terminal-per-station operation, the blocking and releasing means is prevented from operating by the use of level marking returned to the reverting call circuit by the reverting call selector circuit whenever a connector in a level of terminal-per-station connectors is seized. Thus, any digit can be used as a final digit for terminal-per-station operation.

Further objects and advantages of the invention will become apparent as the following description proceeds and the features of novelty which characterize the invention will be pointed out in particularity in the claims annexed to and forming a part of this specification.

For a better understanding of the invention, reference may be had to the accompanying drawings which comprise eight figures on seven sheets:

Fig. 1 shows the trunking diagram of a telephone system;

Figs. 2–5, inclusive, show details of a reverting call circuit and a fragmentary drawing of a reverting call selector;

Figures 1, 8:
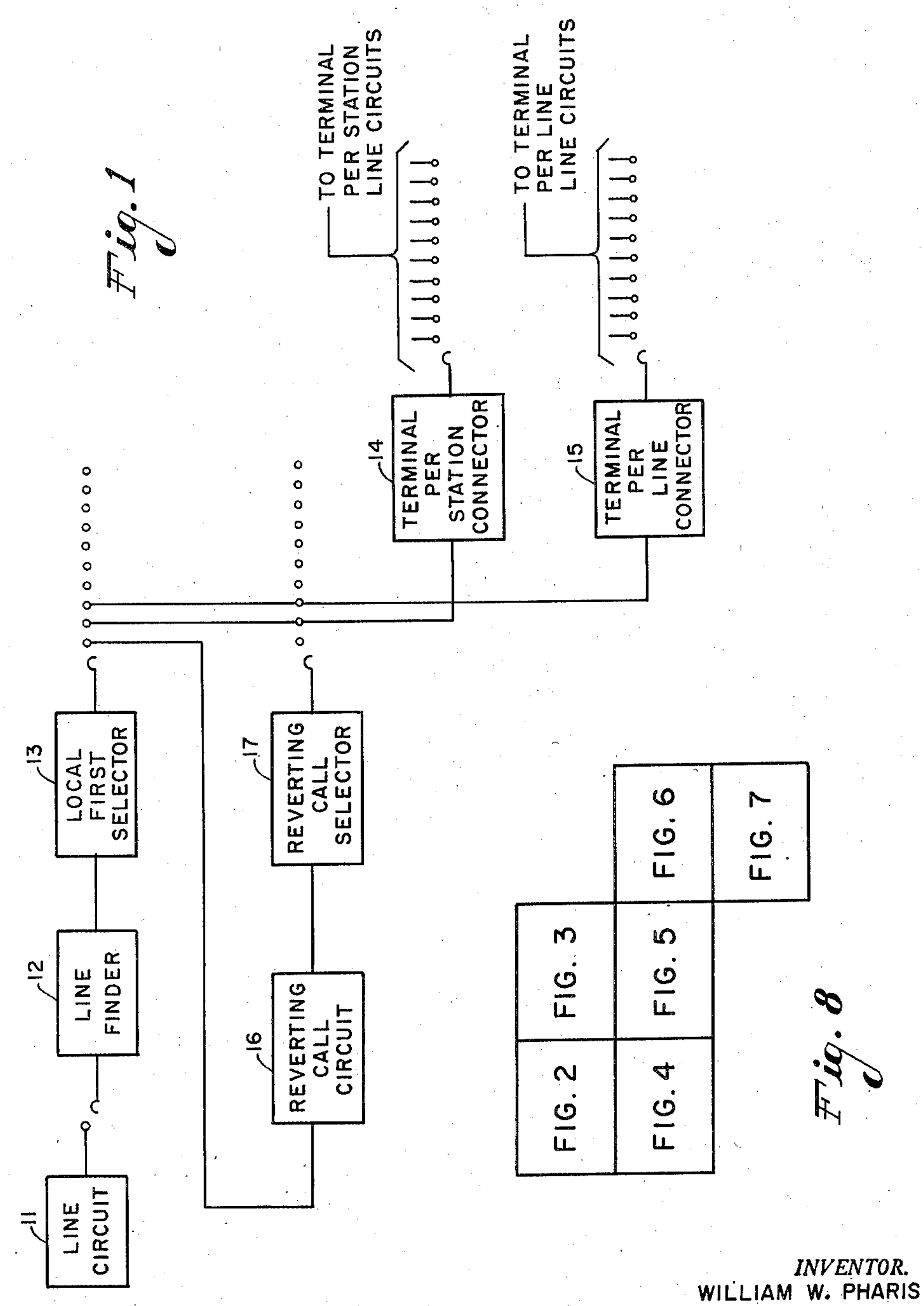
Fig. 8 illustrates the recommended arrangement of the drawings of Figs. 2–7, inclusive, to show the invention.
Figure 2:
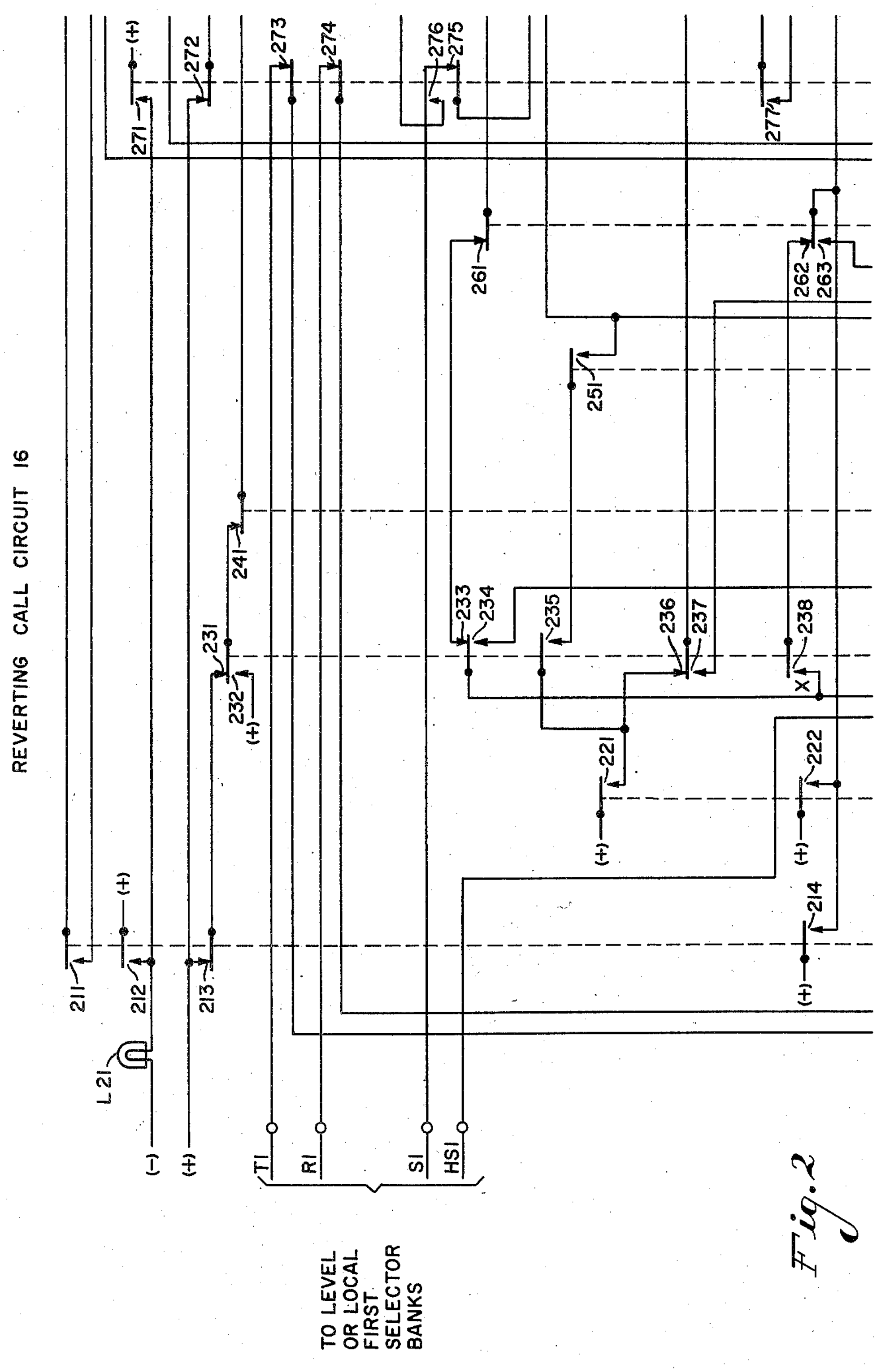
Figure 3:
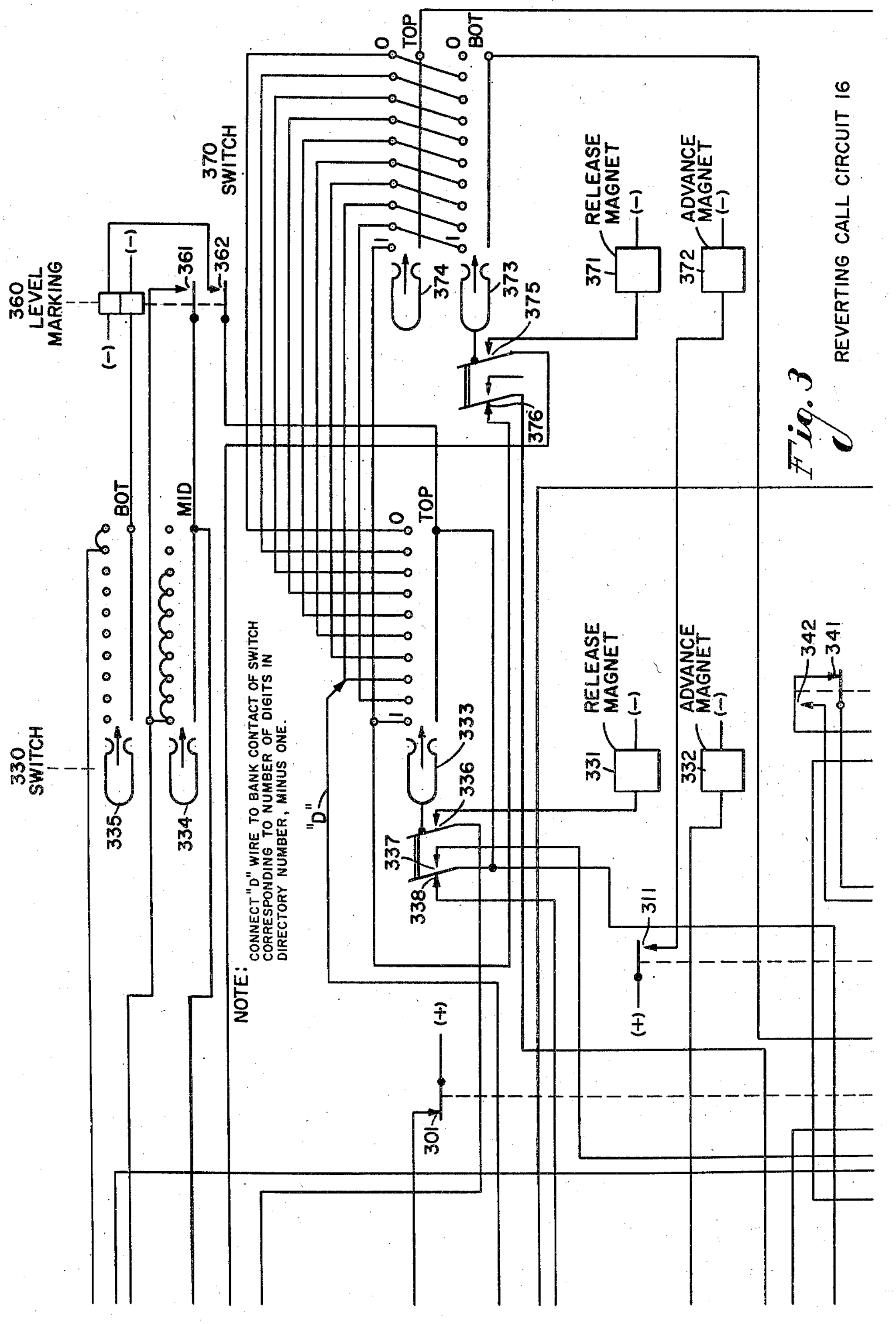
Figure 4:
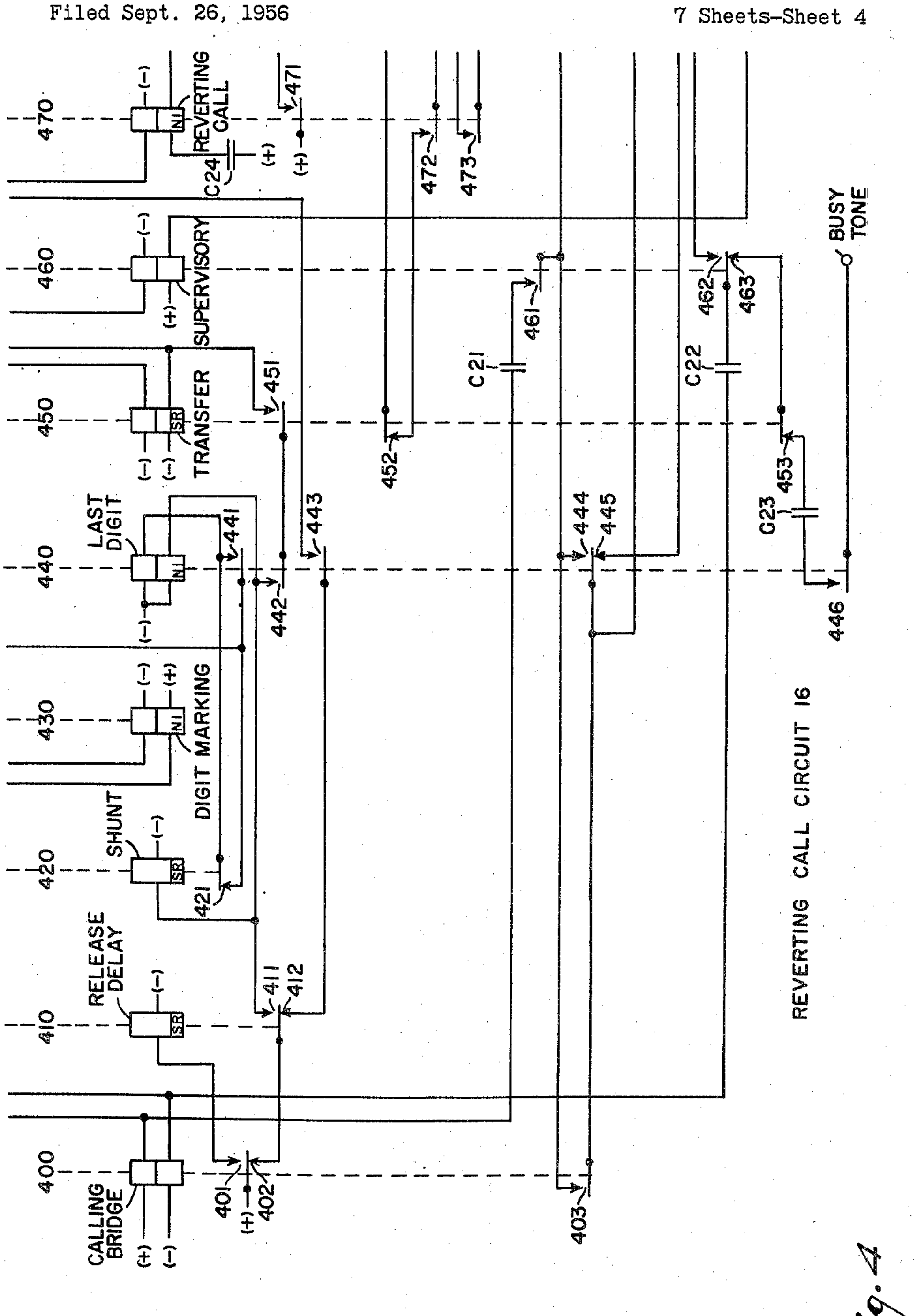
Figure 5:
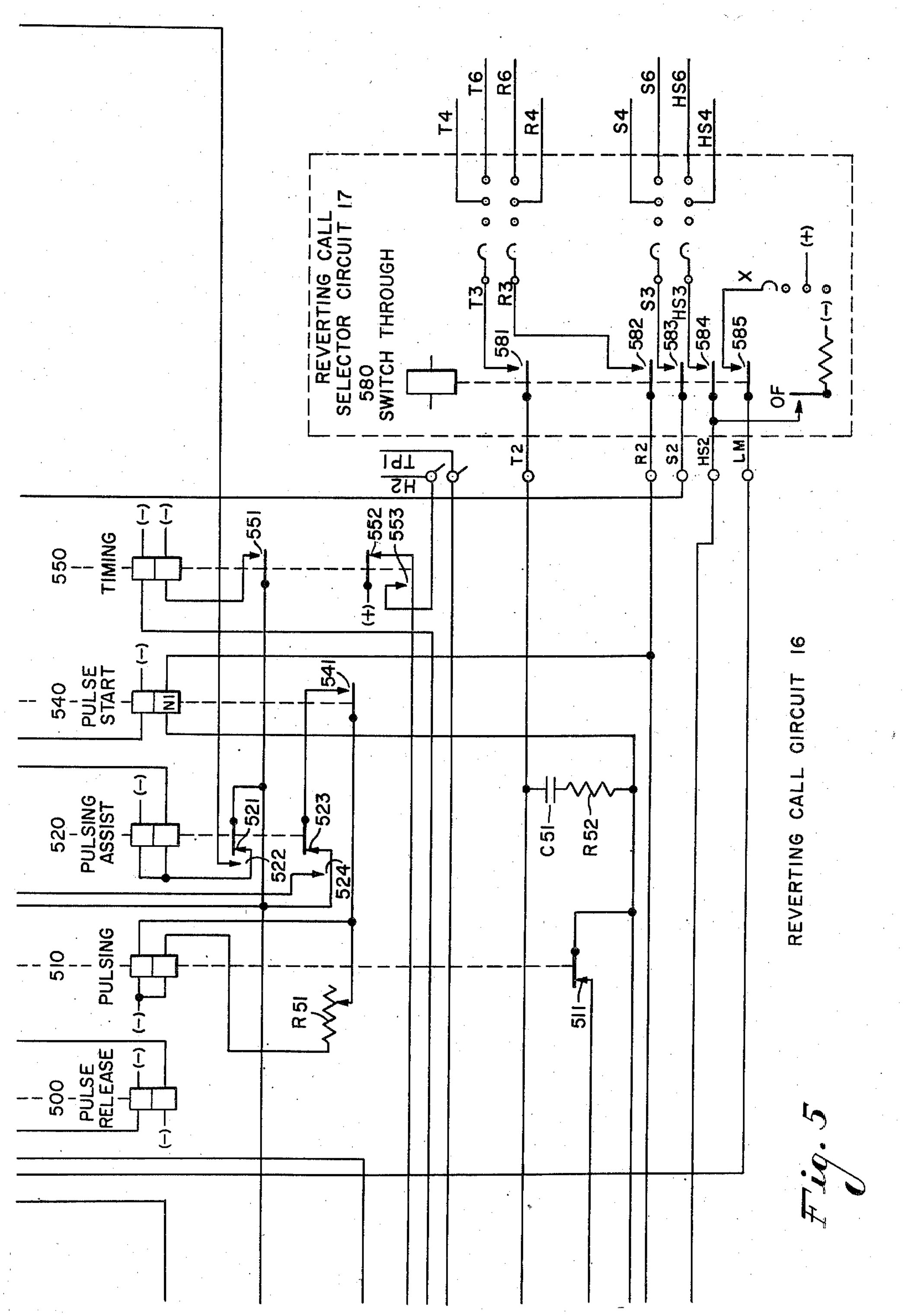

The general operation of the system can best be illustrated by referring to the trunking diagram of Figure 1. The invention has been illustrated as embodied in a one thousand line system wherein each subscriber station of the system has a four digit directory number assigned thereto. The four digits assigned to the terminal-per-line subscriber stations represent hundreds, tens, units, and ringing selecting digits respectively. The four digits assigned to the terminal-per-station subscriber stations represent an absorbed digit, hundreds, tens, and units digits respectively.

Line circuit 11 represents a calling line and may be either a terminal-per-line or terminal-per-station line circuit. The stations associated with line circuit 11 have access to the stations on any of the other lines through line finder 12, local first selector 13, and either terminal-per-station connector 14 or terminal-per-line connector 15, depending upon whether the called line is terminal-per-station or terminal-per-line, respectively. It can be seen that the terminal-per-station connectors, such as connector 14, terminate in the second level and terminal-per-line connectors, such as connector 15, terminate in the third level of the banks of local first selector 13. It will be understood, of course, that other groups of connectors may terminate in the other levels of the banks of selector 13.

Reverting calls are made in the illustrated system by prefixing the digit "1" to the directory number of the desired station. For this purpose, reverting call circuit 16 is shown as terminating in the first level of bank contacts of selector 13. The number of reverting call circuits required is dictated by traffic conditions. The unused terminals in the first level of the selector bank are connected to ground and thus marked busy to selector 13, as is well known in the art. The first digit of the directory number is repeated by circuit 16 to reverting call selector 17. Selector 17 is identical to selector 13 except that it includes level marking on the second level to identify terminal-per-station connectors to reverting call circuit 16. If the first digit dialed is "3," selector 17 switches through to an idle terminal-per-line connector, such as connector 15. If the first digit dialed is "2," or some other arbitrary digit assigned for digit absorbing, selector 17 steps out and then returns to normal. On a terminal-per-line reverting call, the second and third digits of the directory number, repeated by circuit 16, set connector 15 in the primary and secondary directions and thus select the called line. On a terminal-per-station reverting call, the second digit steps selector 17 to the second level where it seizes an idle connector, such as connector 14, and the third digit steps connector 14 in the primary direction.

The digital impulses of the fourth and final digit of the directory number received over the calling line are stored in reverting call circuit 16 and are not repeated to the seized connector at this time. Busy tone is returned to the calling party and he, in accordance with directory instructions, hangs up. If it be assumed that digits 1–8, inclusive, are assigned for the ringing digits of the terminal-per-line stations throughout the office, the dialing of the digits "9" or "0" as a final digit by the calling party will result in the release of circuit 16 and all of the other circuits involved in the connection. However, if the final digit dialed on a terminal-per-line call is any one of the digits 1–8, inclusive, a replica of the digital impulses is transmitted to connector 15 when the calling station hangs up. These pulses are used to position the ringing selecting minor switch in connector 15. When the next to the last impulse of the final digit is sent, ground is removed from the back sleeve by circuit 16 to release selector 13, line finder 12, and line circuit 11, and thus mark the line as idle. Connector 15 then switches through to the calling line, assumed to be line circuit 11, and rings the desired station on that line. When any station on the line answers, circuits 16 and 17 are released, and the calling and called parties are supplied talking battery through the windings of the answer bridge relay in connector 15.

On a terminal-per-station reverting call, the final digit is transmitted to connector 14 when the calling party hangs up, regardless of the digital value of the last digit. The level marking returned from selector 17 when the second level is selected, prevents the release of the connection if either of the digits "9" or "0" is the final digit. The impulses of the final digit cause connector 14 to advance in its secondary direction to select the set of terminals in its banks corresponding to the called station. As before, selector 13, line finder 12 and line circuit 11 are released by circuit 16, and connector 14 switches through and rings the called station. When the call is answered, circuits 16 and 17 are released as previously described.

Figure 6:
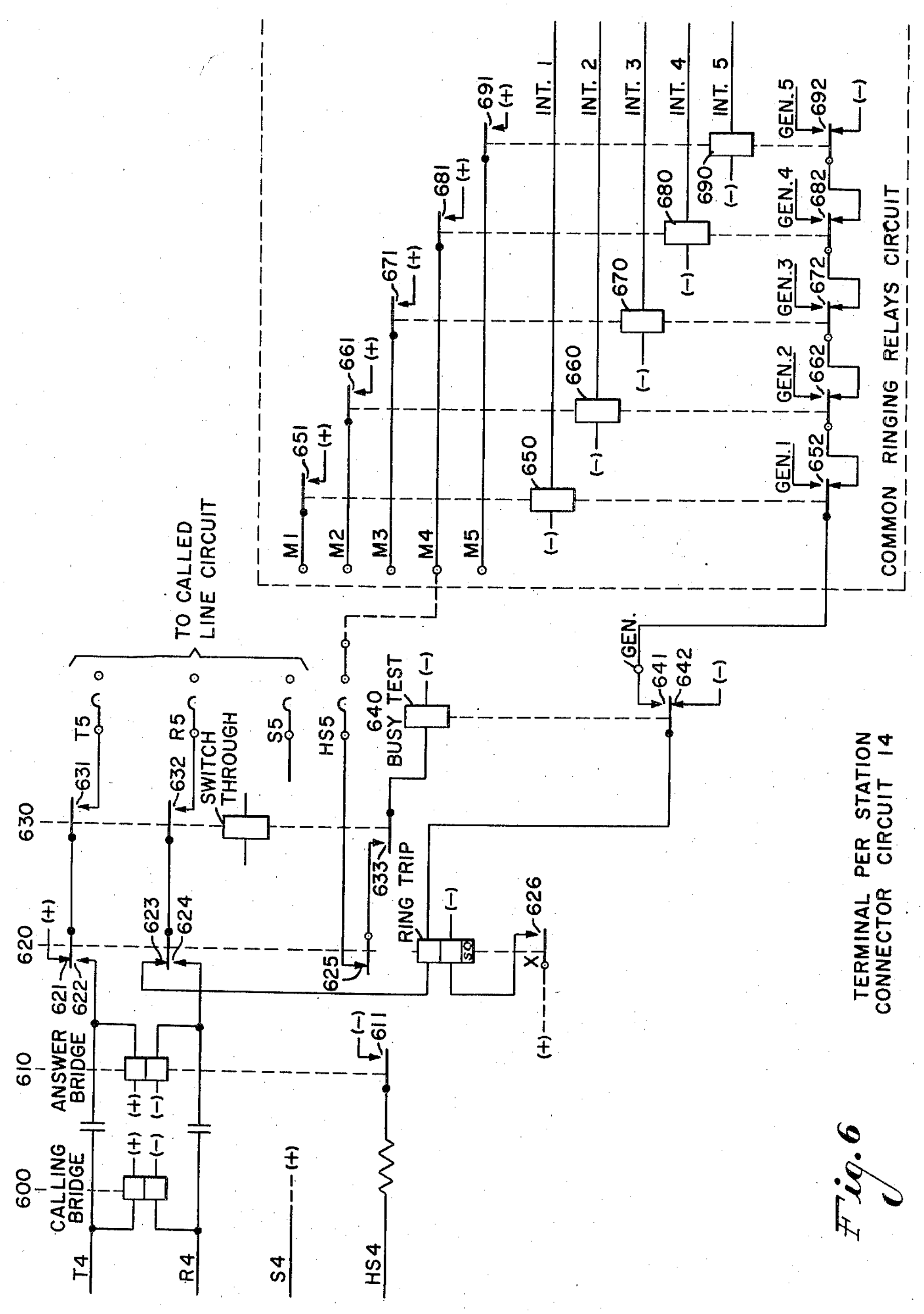
Fig. 6 shows a portion of a terminal-per-station connector circuit.

It is believed expedient to a more complete understanding of the invention to describe the operation of the terminal-per-station and terminal-per-line connector circuits before proceeding to describe the detailed operation of the reverting call circuit 16. Referring to Figure 6, it can be seen that connector 14 is seized over conductors T4, R4, S4 and HS4. As previously explained, these conductors terminate in the second level of both local first selector 13 and reverting call selector 17. Calling bridge relay 600 operates responsive to the closure of a loop across conductors T4 and R4, and is then pulsed by dial impulses to step the connector switch in the primary and secondary directions to select the terminals of the called station in the well known manner. If the called line is idle, switchthrough relay 630 operates and ground is forwarded over sleeve wiper S5 to seize the called line circuit.

It will be noted that the HS terminal of the set of bank contacts individual to the called station is strapped to one of the M1–M5 conductors for the purpose of selecting the frequency or type of ringing signal individual to that station on the called line. In the illustrated example, the HS terminal is strapped to conductor M4. It will be obvious by inspection that each time that ground appears on conductor INT4 from the interrupter machine, relay 680 operates and at contacts 681 closes ground to conductor M4 and at contacts 682 closes GEN4 to the common generator conductor GEN. Ground appearing on conductor M4 operates busy test relay 640 through break contacts 625 on unoperated relay 620, and through operated make contacts 633 on relay 630. Ringing generator is applied to the called line through operated make contacts 641 on relay 640, the upper winding of ring trip relay 620, break contacts 623 on relay 620, and through operated make contacts 632 on relay 630 to the ring wiper R5. The ringing current is passed through the ringer at the called station and is returned to ground over wiper T5, through operated make contacts 631 and break contacts 621. During off periods of the ringing, trip battery is supplied through break contacts 642 on unoperated relay 640.

When the call is answered, ring trip relay 620 operates on its upper winding and locks operated on its lower winding through operated preliminary make contacts 626. At contacts 622 and 624, relay 620 closes the loop completed at the answering station to the windings of the answer bridge relay 610 to operate said relay. At contacts 621 and 623, relay 620 interrupts the ringing circuit and at contacts 625 opens the operating circuit for relay 640. At operated make contacts 611, relay 610 closes battery to conductor HS4 and thus returns answer supervision to the preceding circuits.

Figure 7:
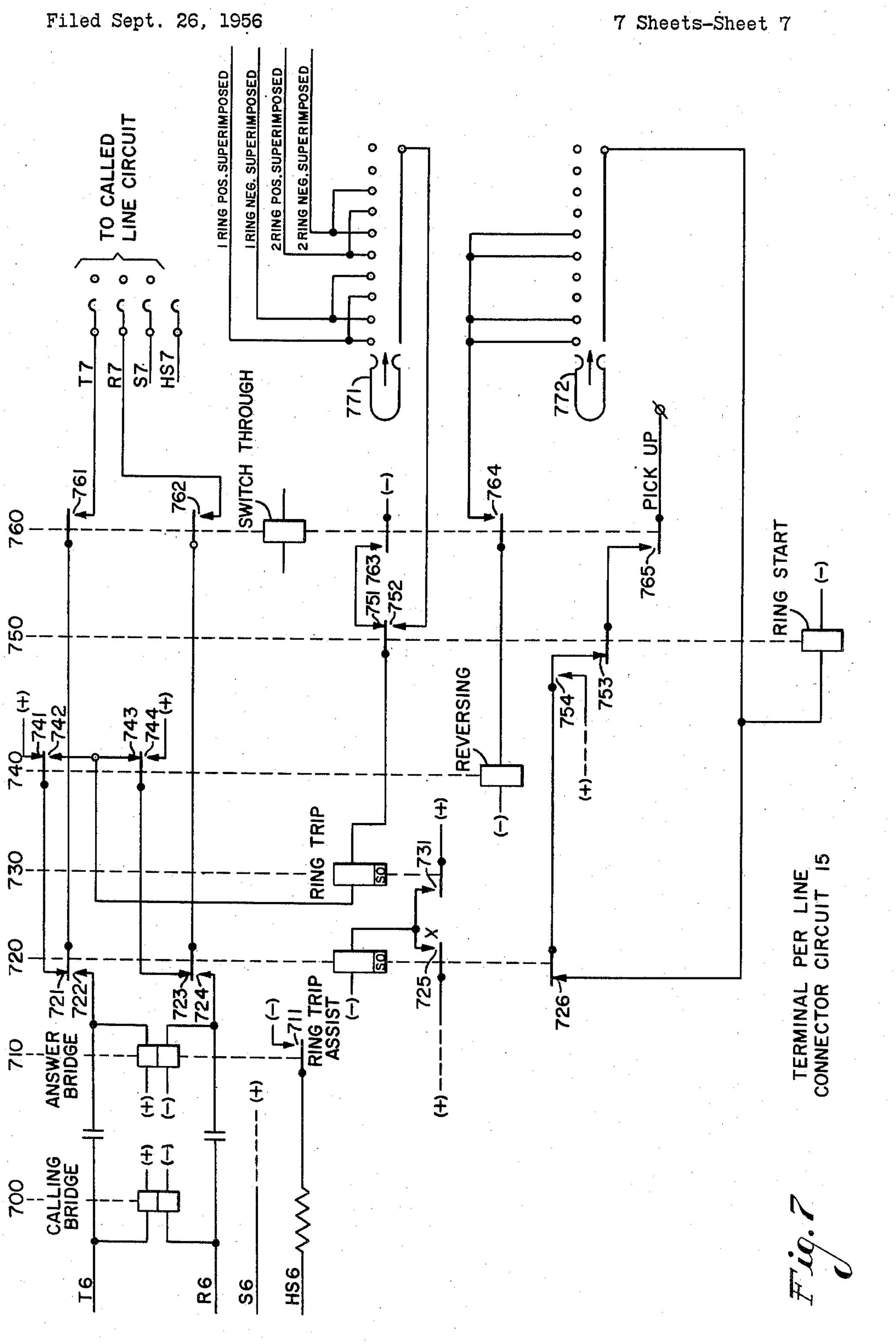
Fig. 7 shows a portion of a terminal-per-line connector circuit.

Terminal-per-line connector 15, which is shown in Figure 7, is seized over conductors T6, R6, S6 and HS6 by either local selector 13 or reverting call selector 17. Calling bridge relay 700 is pulsed by the digital impulses of the second, third and fourth digits of the directory number to set the connector switch in the primary and secondary directions to select the called line and to advance the minor switch wipers 771 and 772 to select the ringing signal, respectively. It will be noted that the bank contacts associated with minor switch wiper 771 are wired for eight-party service so that terminal-per-line stations are assigned ringing digits from 1–8. As previously described, the banks could be wired for four-party service, if desired, and any four of the terminals could be used. If the called line is idle, switch-through relay 760 operates at the completion of the final digit to seize the called line circuit. As shown, ringing digits 1, 2, 5 and 6 control the connector to apply ringing voltage to the tip wiper T7 and ringing digits 2, 3, 7 and 8 control the connector to apply ringing voltage to the ring wiper R7. When ground appears on the pickup conductor from the interrupter circuit at the beginning of a ringing cycle, ring start relay 750 operates from this ground, through operated make contacts 765 on relay 760, through break contacts 753 on unoperated relay 750, and through break contacts 726 on unoperated relay 720. At its make contacts 754, relay 750 locks operated under control of ring trip assist relay 720.

It it be assumed that the ringing digit dialed was "1," reversing relay 740 operates from the pickup ground and through the common bar of the lower minor switch banks, wiper 772, bank contact 1, and through operated make contacts 764 on relay 760. One ring positive superimposed ringing generator is now applied through wiper 771, operated make contacts 752 on relay 750, through the winding of ring trip relay 730, operated make contacts 742 on relay 740, break contacts 721 on unoperated relay 720, and through operated make contacts 761 on relay 760 to the tip wiper T7. The ring wiper R7 is, of course, returned to ground, through operated make contacts 744 on relay 740. If a ring side of the line ringing digit, such as "3," is dialed, relay 740 does not operate and ringing generator is applied to the ring connector R7, through break contacts 743 on relay 740.

When a party on the called line answers, ring trip relay 730 operates and at contacts 731 closes an obvious operating circuit for ring trip assist relay 720. At make contacts 722 and 724, relay 720 closes the loop completed at the answering station to the windings of answer bridge relay 711 to operate said relay. At make contacts 701, relay 710 applies battery potential to conductor HS6 to relay answer supervision to the preceding circuits. Relay 720 locks operated through its preliminary make contacts 725. At break contacts 721 and 723, relay 720 opens the operating circuit for relay 730, and at break contacts 726, relay 720 opens the operating circuit for relays 740 and 750.

Now, if a calling party in attempting to dial the number of a subscriber on his own line should inadvertently dial a final digit of "9" or "0," it can be seen that no trip battery is provided to operate ring trip relay 730. Therefore, answer by any party on the line has no effect on the connector, and the connection is locked up until the reverting call circuit times out. The reverting call circuit, which forms the subject matter of this invention, is designed to prevent this occurrence.

The reverting call circuit 16 is shown in detail in Figures 2–5, inclusive. As previously explanied, circuit 16 is seized by prefixing the digit "1" to the directory number of the called station. When local selector circuit 13 switches through, calling bridge relay 400 operates over a circuit extending from ground, through the upper winding of relay 400, through break contacts 273 on unoperated relay 470, over tip conductor T1, through the loop closed at the calling station, back over ring conductor R1, through break contacts 274 on relay 470, and through the lower winding of relay 400 to battery. At its operated contacts 403, relay 400 closes a loop circuit to the calling bridge relay (not shown) in the reverting call selector circuit 17. The loop circuit extends from conductor T2, through operated contacts 403 on relay 400, through break contacts 445 on relay 440 and break contacts 511 on relay 510 in parallel, and through the lower non-inductive winding of relay 540 to conductor R2. Thus, the selector circuit 17 is seized and is prepared to receive the impulses of the first digit dialed into circuit 16. Ground potential applied to conductor S2 by selector 17 in the well known manner is returned through break contacts 275 on relay 470 to conductor S1 to hold the preceding circuits operated. At its operated make contacts 401, relay 400 closes an obvious operating circuit for release delay 410. Relay 410, in operating, closes ground at contacts 212 to monitor lamp L21, at contacts 213 opens a point in the release circuit of the reverting call circuit, and at operated make contacts 214 closes an operating ground to transfer relay 450. The operating circuit for relay 450 extends from ground on contacts 214, through break contacts 338 of the off-normal pile-up of minor switch 330 and through the upper winding of relay 450 to battery.

Calling bridge relay 400 is pulsed in accordance with the dialed impulses of the first digit of the directory number received over the calling line and at contacts 403 repeats these impulses to the selector circuit 17. Capacitor C51 and resistor R52 comprise a spark protection network for the pulsing contacts. Upon the first release of relay 400, shunt relay 420 operates from ground through break contacts 402 on relay 400, through operated make contacts 411 on relay 410, and through its winding to battery. It should be mentioned at this time that both release delay 410 and shunt relay 420 are of the slow release type and remain operated over the pulsing of contacts 401 and 402, respectively. The operation of shunt relay 420 serves to close an operating ground to the advance magnet 332 of minor switch 330. This ground originates on operated make contacts 221 of relay 420 and is conducted through break contacts 236 on relay 430 to magnet 332. Since relay 420 remains operated for the duration of the digit, minor switch 330 is stepped just one step per digit, regardless of the absolute value of the digit. At the completion of the digit, relay 420 releases to deenergize the advance magnet 332. Relay 450 also releases since its operating circuit is opened at contacts 338 of the minor switch 330, which contacts open when the minor switch is advanced off-normal.

The second digit dialed into circuit 16 is repeated to conductors T2 and R2, and shunt relay 420 operates to advance switch 330 to its second position. If the reverting call is being made on a terminal-per-station line, the first digit will be absorbed in selector 17 and the second digit will advance selector switch 17 to the second level where the switch hunts for and switches through to an idle terminal-per-station connector. Switchthrough relay 580 in selector 17 operates and at its make contacts 581–584, inclusive, cuts through conductors T2, R2, S2 and HS2 to wipers T3, R3, S3 and HS3, respectively. This, of course, will result in closing a loop to the selected connector and in seizing the calling bridge relay therein. If the second level is dialed, the X-brush in selector 17 is connected to ground to mark the level marking conductor LM so as to signify to circuit 16 that the reverting call is being made on a terminal-per-station line. It should be mentioned that the X-brush of the selector switch moves in the primary direction as the main wipers are moved in the primary direction and remains in that position while the main wipers advance in the secondary direction. The switch used in this selector, as well as in the other selectors and connectors of the system, may be a flat type step-by-step switch of the type sold under the trademark "XY." For a detailed description of the switch, reference may be had to the Frank A. Morris Patent 2,567,650, which is assigned to the same assignee as the present invention. If the reverting call is being made on a terminal-per-line line, selector 17 switches through to an idle connector in the third level on the first digit, and the second digit is utilized to advance the connector switch in the primary direction, as previously described. If all of the connectors in a selected level are busy, selector 17, of course, hunts to overflow. Resistance battery is connected through overflow contacts OF to conductor HS2 and 120 IPM busy tone is applied to conductors T2 and R2. In circuit 16, supervisory relay 460 operates and at make contacts 461 and 462 couples the busy tone to the calling line.

The third digit dialed into circuit 16 is repeated at contacts 403 to succeeding circuits. Upon the first release of relay 400, shunt relay 420 again operates to advance minor switch 330 to its third step. Since the disclosed system is a four digit system, conductor D is strapped to the third contact in the top bank of minor switch 330 as denoted in Figure 3 of the drawings. With this connection, ground through operated make contacts 214 on relay 410 is connected through wiper 333 of switch 330 to the third bank contact, over D wiring, through break contacts 261 on unoperated relay 460, break contacts 233 on unoperated relay 430, and through the upper winding of relay 430 to battery. Digit marking relay 430 operates over this circuit and at its preliminary make contacts 238 locks operated to ground on contacts 214, through break contacts 262 on unoperated relay 460. At its operated make contacts 232, relay 430 connects ground through break contacts 241 on relay 440, and through make contacts 336 in the off-normal pile-up of minor switch 330 to the release magnet 331 of switch 330. Switch 330 is thus restored to normal after having counted the first three digits of the directory number. When switch 330 restores to its normal position and thus recloses off-normal contacts 338, transfer relay 450 operates on its upper winding, as previously described. At the completion of the third digit, relay 420 releases and at break contacts 421 closes an operating circuit for the last digit relay 440. This circuit extends from ground on the upper winding of relay 430, through operated make contacts 234 on relay 430, through break contacts 421, and through the upper winding of relay 440 to battery. At its operated make contacts 441, relay 440 locks operated to the just described ground independently of the break contacts 421. At operated make contacts 444, relay 440 closes a shunt path across the outgoing loop so as to prevent contacts 403 on calling bridge relay 440 from repeating the final digit to the succeeding circuits.

The fourth and final digit of the directory number received over the calling line causes relay 400 to pulse and relay 420 to operate, as previously described. In addition, the impulses of this digit are coupled to the advance magnet 332 of switch 330 so that switch 330 registers the number of impulses in the final digit. The pulsing path extends from ground, through contacts 402, operated make contacts 411 on relay 410, operated make contacts 442 on relay 440, operated make contacts 451 on relay 450, operated make contacts 237 on relay 430, and through the winding of magnet 332 to battery. It will be noted that this pulsing path is also coupled through the lower winding of transfer relay 450 for the purpose of maintaining that relay operated during the digit. At the completion of the fourth and final digit, relay 400 remains operated, shunt relay 420 releases, and transfer relay 450 now releases. It will be noted that relay 450 is locked operated through make contacts 221 on relay 420, operated make contacts 235 on relay 430 and operated make contacts 251 on relay 450 until relay 420 releases. When relay 450 releases, busy tone is coupled to the calling subscriber for the purpose of informing him that he should now hang up so that the called party can be rung. Busy tone appearing on the busy tone conductor is coupled through operated make contacts 446 on relay 440, capacitor C23, break contacts 453 on relay 450, break contacts 463 on relay 460, capacitor C22, and through break contacts 274 on relay 470 to conductor R1, and thus to the calling party.

Assume that the final digit dialed was the digit "3." When the calling party hangs up, calling bridge relay 400 releases. Shunt relay 420, of course, operates through break contacts 402 on relay 400. After a short period of time, release delay relay 410 releases to close an operating circuit to the reverting call relay 470. The operating circuit for relay 470 extends from ground, through break contacts 402 on relay 400, through break contacts 412 on relay 410, operated make contacts 443 on relay 440, through terminal 3 and wiper 334 of the mid bank of minor switch 330, and through the upper winding of relay 470 to battery. After a short period, relay 420, which was deenergized when relay 410 released, releases. The back sleeve conductor S1 is now supplied ground through operated make contacts 276 on relay 470 and through break contacts 301 on unoperated relay 500. The holding ground for relays 430 and 440 is now derived from ground on break contacts 552 of unoperated relay 550, through operated make contacts 472 on relay 470, break contacts 452 on relay 450, off-normal springs 337, and through break contacts 262 on unoperated relay 460.

Next, assume that the final digit dialed was "9," and that the reverting call is being made on a terminal-per-station line. During the final digit, level marking ground returned from selector 17 over conductor LM is conducted through operated make contacts 211 on relay 410 and through the ninth bank contact and wiper 335 of the bottom bank of switch 330, and through the lower winding of level marking relay 360 to battery. Relay 360 operates in this circuit and at its make contacts 362 closes a locking circuit to its lower winding. At operated make contacts 361, relay 360 closes a shunt across the middle banks and wiper 334 of minor switch 330 so that reverting call relay 470 can operate when the calling party hangs up, even though the digit "9" was dialed as a final digit.

Next, assume that the final digit dialed was "9" and that the reverting call was placed by a party on a terminal-per-line line. Under these conditions, there is no level marking ground returned from selector 17, relay 360 remains unoperated, and reverting call relay 470 cannot operate when the calling party releases. Therefore, when the calling party hangs up, relay 400 releases, relay 420 operates, relay 410 releases, and then relay 420 releases, all as previously described. In addition, the last digit relay 440 releases since reverting call relay 470 remains unoperated and the holding ground for relay 440 is interrupted at contacts 472 on relay 470. When relay 440 releases, the loop to the connector circuit is opened at contacts 444. The connector releases, removes ground from sleeve conductor S2 and since the back sleeve ground is supplied through break contacts 275 on unoperated relay 470, the local first selector 13, the line finder 12 and line circuit 11 are released to completely release the connection. Thus, it will be apparent that if a last digit of "9" or "0" is dialed on a terminal-per-line reverting call, the connection is automatically released.

Returning to the consideration of the operation of reverting call circuit 16 on a call on which the final digit dialed was other than "9" or "0" on a terminal-per-line call or was a terminal-per-station call, it can be seen that when reverting call relay 470 operates, ground is closed through make contacts 471 and through break contacts 521 on pulsing assist relay 520 to operate relay 520 to initiate the transmission of a replica of the stored digital impulses to the connector. Pulse start relay 540 operates from this same ground through operated make contacts 524 on relay 520 and through its break contacts 341. Relay 540 then locks operated through its make contacts 342 to the ground on contacts 471 of relay 470. Relay 520 now releases since it opens its energizing path at its contacts 521. It is to be noted that relay 520 is both slightly slow operate and slightly slow release by virtue of the connection of its lower winding through the non-inductive winding on relay 470 and through capacitor C24 to ground. That is, before the relay can operate, capacitor C24 must discharge through the lower winding of relay 520 since the flux produced in the lower winding opposes the flux produced in the upper winding of relay 520. Also, when the relay is deenergized, it is held operated for the charge time of capacitor C24 during which time the upper and lower windings of relay 520 are in an aiding relationship. When relay 520 releases, pulsing relay 510 operates through break contacts 523 on relay 520 and through operated make contacts 541 on relay 540. At break contacts 511, pulsing relay 510 interrupts the loop circuit to succeeding circuits to advance the switch in the seized connector circuit. Also, at contacts 311, relay 510 energizes the advance magnet 372 of minor switch 370 so as to cause that switch to be advanced to its first position.

Pulsing assist relay 520 continues to operate and release on a self-interrupting basis and thus operate and release pulsing relay 510 until wiper 374 of minor switch 370 encounters a marking ground relayed to it by wiper 333 of minor switch 330, which had registered the impulses of the final digit. If it be assumed that the final digit was "3," pulse release relay 500 is operated when minor switch 370 is advanced to its second position. The operating circuit for relay 500 extends through brush 333 of switch 330, the third bank contact associated with that brush, the second bank contact associated with brush 373, through brush 373, and through the winding of relay 500 to battery. At contacts 301, relay 500 removes ground from the back sleeve for the purpose of releasing the preceding circuits and thus marking the calling line as idle. When the minor switch 370 advances to its third position, relay 520 is locked operated through brush 374 and through its operated contacts 522. Thus, further pulsing is prevented. The connector now switches through to the called line and applies ringing current thereto, as previously described.

If the call should remain unanswered for a period of from two to four minutes, the reverting call circuit is timed out and the connection released. For this purpose, timing relay 550 operates from the first ground pulse appearing on timing conductor TP1 and through operated make contacts 473 on relay 470. Relay 550 locks operated on its lower winding from ground through contacts 471 on relay 470 and through its own operated make contacts 551. Ground appears on conductor TP1 for a short interval every two minutes. At its contacts 552 and 553, timing relay 550 substitutes the locking circuit for relays 430 and 440 from direct ground to ground appearing on conductor H2. When ground disappears from conductor H2, approximately two minutes after the application of ground to conductor TP1, relay 440 releases to open the loop to the connector circuit and thus initiate the release of the connection.

If the call is not timed out, and instead, some party on the line answers the call, resistance battery is returned over conductor HS2 from the connector to operate supervisory relay 460 on its lower winding. At contacts 262, relay 460 opens the operating ground for relays 430 and 440 which relays then release. Release magnet 331 of switch 330 is now energized from ground through break contacts 213 on unoperated relay 410, break contacts 231 on relay 430, break contacts 241 on relay 440, through off-normal contacts 336 and through its winding to battery. When switch 330 is restored to normal, reverting call relay 470 releases and at break contacts 272 closes an energizing ground to release magnet 371 of switch 370. Thus, switch 370 is restored to normal and all of the relays in the reverting call circuit are released.

While there has been shown and described what is at present considered to be the preferred embodiment of the invention, modifications thereto will readily occur to those skilled in the art, and it is, therefore, intended to cover in the appended claims all such modifications as fall within the true spirit and scope of the invention.

What is claimed is:

1. In a telephone system, a reverting call circuit, a connector, means for extending a connection from a calling station on a calling line to said reverting call circuit, means in said reverting call circuit for repeating to said connector the digital impulses of a predetermined number of digits received over the calling line, means in said reverting call circuit for storing digital impulses of a digit following said predetermined number of digits received over the calling line, means in said reverting call circuit responsive to a disconnect operation performed at the calling station for transmitting a replica of said stored impulses to said connector, and means for preventing the operation of said last named means and for releasing said reverting call circuit and the connection if said stored digital impulses have a predetermined digital value.

2. In a telephone system, a party line, a reverting call circuit, a connector, means for extending a connection from a calling station on said party line to said reverting call circuit, means in said reverting call circuit for repeating the digital impulses of a predetermined number of digits received from said calling station to control the extension of a connection to said connector and to then control the operation of said connector in selecting said party line, means in said reverting call circuit for storing digital impulses of a digit following said predetermined number of digits received from said calling station, means in said reverting call circuit for transmitting a replica of said stored impulses to said connector only if said stored impulses have a predetermined digital value, and means in said reverting call circuit for releasing said reverting call circuit and said connection if said stored impulses have a different digital value.

3. In a telephone system of the terminal-per-line type wherein each station on a party line is assigned a directory number comprising a plurality of line selecting digits common to all of the stations on said line and a final ringing selecting digit individual to that station, a reverting call circuit, a connector, means for extending a connection from a calling station on a calling line to said reverting call circuit, means in said reverting call circuit for repeating to said connector the digital impulses of line selecting digits received over the calling line, means in said reverting call circuit for storing the digital impulses of the ringing selecting digit received over the calling line, means in said reverting call circuit responsive to a disconnect operation performed at the calling station for transmitting a replica of the stored digital impulses to said connector, and means for preventing the operation of said last named means and for releasing said reverting call circuit and the connection if said stored digital impulses have a predetermined digital value.

4. In a telephone system of the terminal-per-line type wherein each station on a party line is assigned a directory number comprising a plurality of line selecting digits common to all of the stations on said line and a final ringing selecting digit individual to that station, a reverting call circuit, a connector, means for extending a connection from a calling station to said reverting call circuit, means in said reverting call circuit responsive to impulses of line selecting digits received from said calling station for repeating said impulses to control the extension of a connection to said connector and to then control the operation of said connector, means in said reverting call circuit for storing the impulses of the ringing selecting digit received from said calling station, means in said reverting call circuit responsive to a disconnect operation performed at said calling station for transmitting a replica of said stored impulses to said connector only if said stored impulses have a predetermined digital value, and means in said reverting call circuit responsive to a disconnect operation performed at said calling station for releasing said reverting call circuit and said connection if said stored impulses have a different digital value.

5. In a telephone system, a reverting call circuit, a first party line connector of the terminal per station type, a second party line connector of the terminal per line type, means for connecting a calling station on a calling line to said reverting call circuit, means in said reverting call circuit for repeating digital impulses of a predetermined number of digits received over the calling line to select either said first or second connector and to then control the operation of the selected connector, means in said reverting call circuit for storing digital impulses of a digit following said predetermined number of digits received over the calling line, means responsive to a disconnect operation performed at the calling station for transmitting a replica of said stored digital impulses to said selected connector, means for preventing the operation of said last named means and for releasing said reverting call circuit and the connection if said stored digital impulses have a predetermined digital value, and means for preventing the operation of said last named means whenever said first connector is the selected connector regardless of the digital value of said stored digital impulses.

6. In a telephone system, a first party line connector of the terminal-per-station type, a first party line terminating in the banks of said first connector, a second party line connector of the terminal-per-line type, a second party line terminating in the banks of said second connector, a reverting call circuit common to said first and second connectors, means for extending a connection from a calling station on either said first or second lines to said reverting call circuit, means in said reverting call circuit for repeating the digital impulses of a predetermined number of digits received from the calling station to select either the first or second connectors respectively, and to then control the operation of the selected connector, means in said reverting call circuit for storing digital impulses of a digit following said predetermined number of digits received from the calling station, means in said reverting call circuit responsive to a disconnect operation performed at a calling station on said first party line for transmitting a replica of said stored digital impulses to said first connector regardless of the digital value of said stored impulses, and means in said reverting call circuit responsive to a disconnect operation performed at a calling station on said second party line for transmitting a replica of said stored digital impulses to said second connector only if said stored digital impulses have a predetermined digital value.

7. In a telephone system, a reverting call circuit, a selector having levels of bank contacts, a group of terminal-per-station connectors terminating in a first level of said selector bank contacts, a group of terminal-per-line connectors terminating in a second level of said selector bank contacts, means for connecting a calling station on a calling line to said reverting call circuit, means in said reverting call circuit for repeating to said selector the digital impulses of a predetermined number of digits received over the calling line to control said selector to select one of said connectors and to then control the operation of the selected connector, means in said reverting call circuit for storing digital impulses of a digit following said predetermined number of digits received over the calling line, means responsive to a disconnect operation performed at the calling station for transmitting a replica of said stored digital impulses to said selected connector, means for preventing the operation of said last named means and for releasing said reverting call switch and the connection if said stored digital impulses have a predetermined digital value, and level marking means associated with said first level of said selector banks and operated when a connector in that level is selected for preventing the operation of said last named means regardless of the digital value of said stored digital impulses.

No references cited.